(12) United States Patent
Gray

(10) Patent No.: US 6,374,955 B1
(45) Date of Patent: Apr. 23, 2002

(54) BRAKING ASSEMBLY

(75) Inventor: Andrew P. P. Gray, Copmanthorp (GB)

(73) Assignee: Gray Matter (Alpha) Ltd., York (GB)

( * ) Notice: Subject to any disclaimer, the term of this patent is extended or adjusted under 35 U.S.C. 154(b) by 0 days.

(21) Appl. No.: 09/711,888

(22) Filed: Nov. 15, 2000

(30) Foreign Application Priority Data

Nov. 15, 1999 (GB) .............................................. 9926992

(51) Int. Cl.[7] .............................. B62B 5/04; B62B 5/00; B60T 1/14; B60B 33/00
(52) U.S. Cl. .......................... 188/5; 188/1.12; 188/111; 280/33.994
(58) Field of Search ............................. 188/1.12, 5, 111, 188/1.11 R; 16/35 R; 280/33.994

(56) References Cited

U.S. PATENT DOCUMENTS 5,394,962 A * 3/1995 Gray ........................ 188/1.12
5,881,846 A * 3/1999 French et al. .............. 188/1.12
6,173,817 B1 * 1/2001 Gray ............................... 188/5

FOREIGN PATENT DOCUMENTS

WO      9737883      * 10/1997

* cited by examiner

*Primary Examiner*—Douglas C. Butler
(74) *Attorney, Agent, or Firm*—Dykema Gossett PLLC

(57) ABSTRACT

A braking assembly for use with caster wheels of vehicles such as carts includes a main body and a braking member movable relative to the main body, the braking member including an arcuate first portion which extends around a portion of the periphery of the caster wheel and a second plate portion disposed between the first portion and the main body, the second plate portion rotating so as to move the arcuate first portion to between the caster wheel and the supporting surface on which it moves when the braking member is moved from an inoperative position to an operative position, the second plate portion including a raised surface abutted by a trigger finger to retain the braking member in an inoperative position, the trigger finger being movable with passage of the braking assembly over a magnetic area in the supporting surface to release the second plate portion.

7 Claims, 3 Drawing Sheets

BRAKING ASSEMBLY

BACKGROUND OF THE INVENTION

1. Field of the Invention

The present invention relates to a braking assembly, and in particular, but not exclusively, to a braking assembly for use with a vehicle such as a supermarket shopping trolley or cart.

2. The Prior Art

Various systems have been proposed for impeding or deterring removal of supermarket shopping trolleys or carts from the vicinity of a supermarket. For instance, it has been suggested that physical obstacles such as grids and/or narrow stalls should be placed at the exit points of the supermarket or the supermarket parking lot. The obstacles are intended to interact with the trolley's castor wheels or with the trolley itself to impede its removal. These known systems are easily overcome and are unsuitable for use in certain locations, such as motor vehicle entrances for supermarket parking lots.

A braking device designated to overcome these problems is described in International Patent Application Nos. WO 92/15476 and GB 97/00847. The braking device is actuated as it passes over a member or an area of magnetic material to cause a braking member to be applied to the ground to impede the continued movement of the shopping trolley. The braking device is conveniently associated with a castor wheel of the trolley. Other types of braking device utilising a braking member to impede the movement of a trolley are known and these devices and the device described in WO 92/15476 and GB 97/00847 are generally effective in impeding or deterring removal of a trolley from a designated area.

SUMMARY OF THE INVENTION

The present invention provides an improved vehicle braking assembly for a wheel of a vehicle, the assembly including a main body, a braking member arranged to move relative to the main body between an inoperative and an operative braking position, blocking means for normally blocking movement of the braking member to its operative position, and trigger means, which act in response to the main body being passed over magnetic material to release the blocking means to allow movement of the braking member to its operative position in which it is arranged to contact a surface over which the assembly is passed to impede movement of the wheel relative to the surface, by acting to cause the wheel to be raised relative to the surface, wherein in its operative position the braking member is disposed between the wheel and the surface.

The advantages of this novel arrangement are: the braking member comes between the surface and the wheel forming a more effective braking action; as the braking force is now central rather than to one side, as in known devices, there is no turning of the castor and associated loss of braking effect; known braking devices may skate, rather than grip, on smooth surfaces typically used in retail establishments—this is no longer true as the leading edge of the second member is preferably narrow and easily trapped and drawn between the wheel and the floor; and known devices may be vulnerable to vandalism if the main body is rotated, e.g. by being kicked, to prevent the braking member from coming into contact with the ground—if the main body of the present invention is interfered with in such a manner, the braking member will operate straight away and no further interference or vandalism will assist in overcoming the braking effect.

The braking member is preferably mounted co-axially with the wheel. Preferably the braking member is tapered inwardly in the direction of rotation from the inoperative position to the operative position. The braking member may comprise a first portion overlying a portion of the wheel and having an outermost surface for frictional engagement with the surface, and a second portion mounted on the first portion and disposed between the first portion and the main body. The second portion of the braking member may comprise a plate or disc-like member mounted co-axially with the wheel. The braking member may have an elongate channel or slot to permit relative movement of the braking member relative to the wheel to move the braking member closer to the wheel in the operative position.

Cooperating formations project laterally of the trigger means and the braking member to engage when the braking member is in its inoperative position to prevent movement of the braking member to its operative position.

The assembly is preferably fitted to the fork of a castor with the braking member and the vehicle wheel housed within the castor fork. The location of the braking member within the fork further improves the resistance of the device to vandalism.

The present invention also provides a trolley, cart or another vehicle with a braking device of the type discussed above fitted to the fork of a castor.

Further, the present invention provides a braking system comprising the trolley, cart or another vehicle referred to in the previous paragraph, and a strip of magnetic material for mounting in conjunction with the ground, the magnetic material being arranged to cause release of the blocking means upon the passage of the castor over the magnetic material.

A clear understanding of the present invention will be gained from the following detailed description of a preferred embodiment of the invention given by way of example only, with reference to the accompanying drawings.

DETAILED DESCRIPTION OF THE PREFERRED EMBODIMENT

Figure 1:
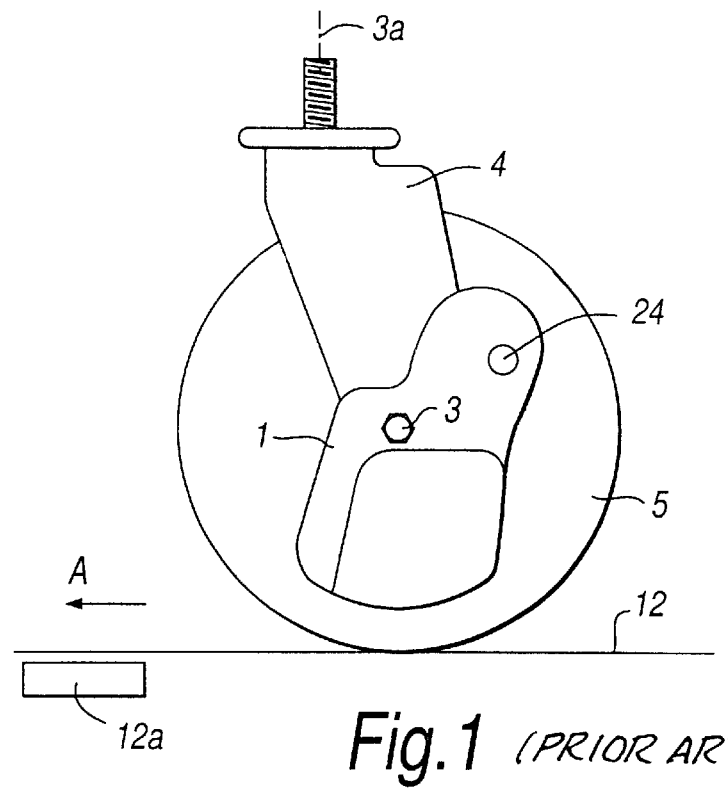
FIG. 1 is a side elevation of a castor carrying a known braking device in its inoperative condition.
Figure 2:
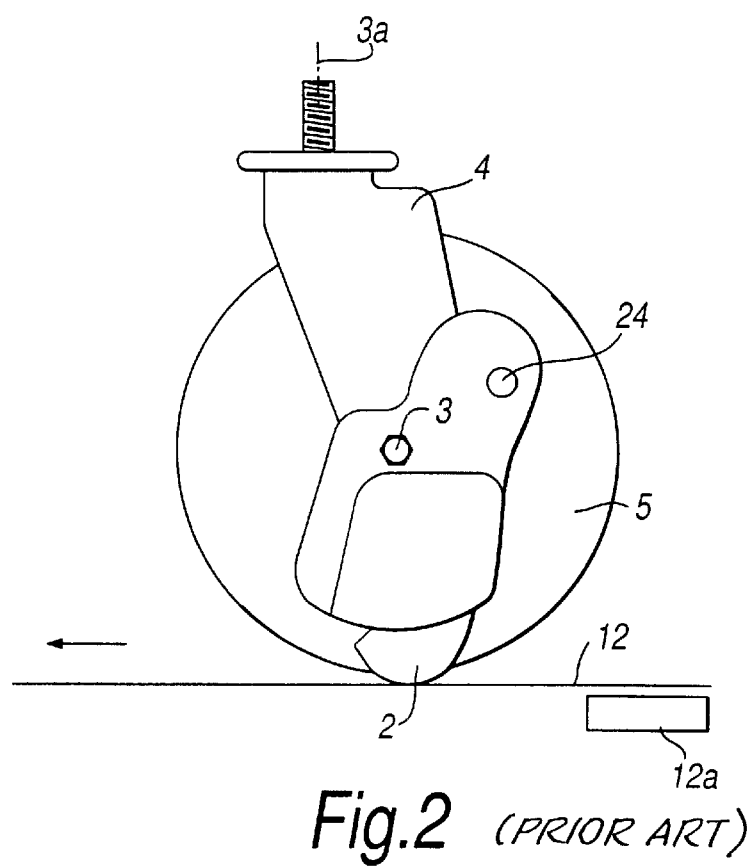
FIG. 2 is a side elevation of the castor of FIG. 1 showing the known device in its operative condition.
Figure 3:
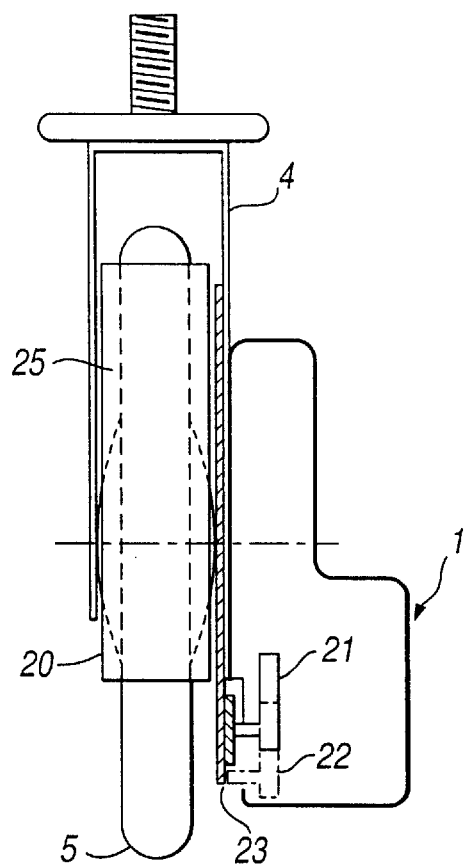
FIG. 3 is a front elevation of a castor carrying a braking assembly according to the present invention.
Figure 4:
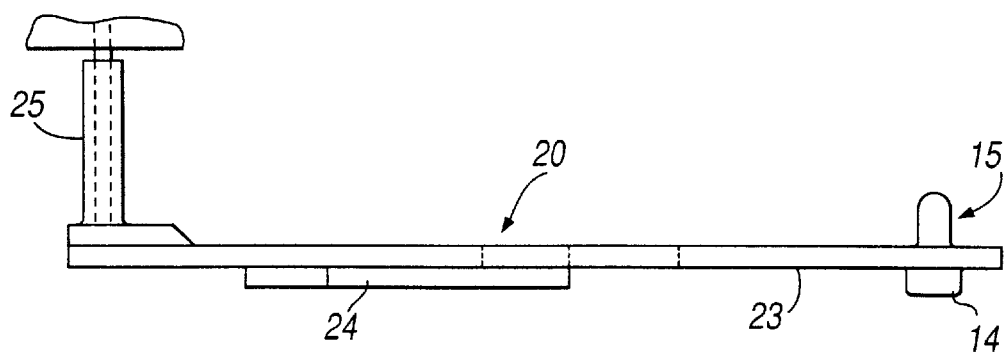
FIG. 4 is a plan view of a braking member shown partially cutaway.
Figure 5:
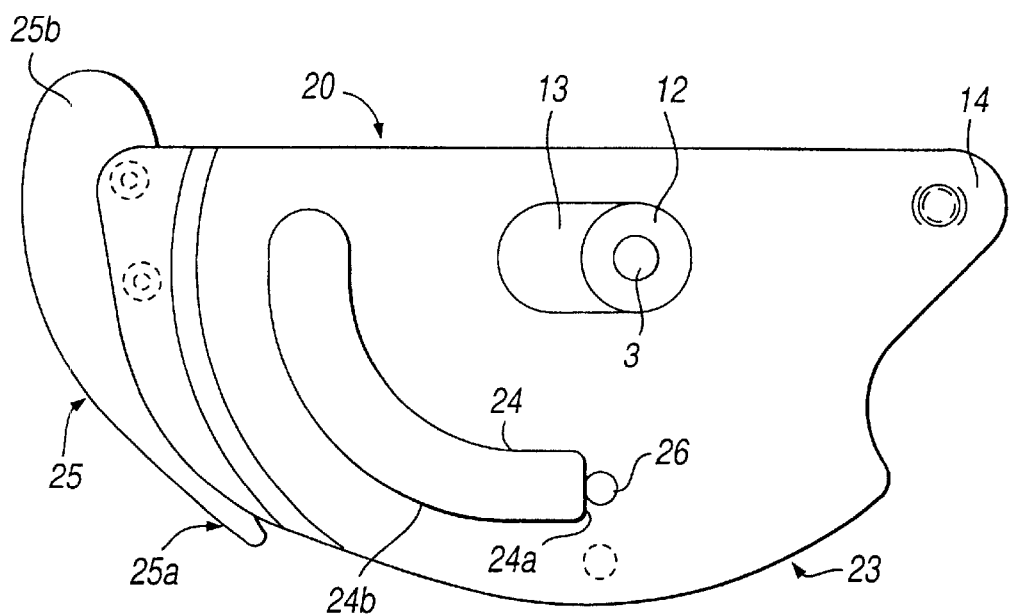
FIG. 5 is a side view of an element of the braking member of FIG. 4.
Figure 6:
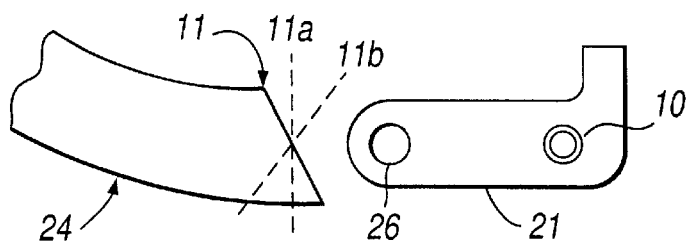
FIG. 6 is a side view of a trigger member of the braking assembly of the invention.
Figure 7:
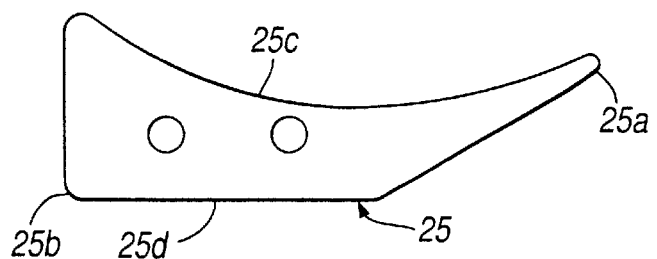
FIG. 7 is a side view of a preferred configuration of an element of the braking member.

The braking device shown in FIGS. 1 and 2 is described in detail in GB 97/00847 and includes a main body 1 and a braking member 2 arranged to move relative to the body to effect the braking by contacting the surface over which the device moves. The body is fixed to a part of a trolley or cart adjacent the surface or ground over which the trolley moves. Preferably, it is fixed to part of a fork 4 of a castor wheel 5 which is rotatable about the axis of fixing means 3, which may be a nut and bolt, by which the wheel 5 is fixed to the fork. The body 1 may be attached to the fork by the same fixing means.

In the assembly of the present invention, the blocking and trigger means operate in the same manner as those of the known device of GB 97/00847, but the braking member 20 is mounted separately of the main body 1 for rotation about the axis 3 of the castor wheel 5.

The braking member 20 has a generally semi-circular plate or sheet 23 mounted for rotation about the wheel axis 3, and an arcuate flange 25 projecting orthogonally of the plate rim and overlying a portion of the outer surface of the wheel 5. The inner surface of the flange 25c is generally concentric with the outer wheel surface. The outer surface 25d of the flange 25 is generally parallel with the tangent at the central point of the wheel portion it overlies, and tapers inwardly in the direction of rotation from the inoperative position to the operative position towards a point at its leading edge 25a. The plate 23 has an arcuate raised surface 24, the end surface 24a of which abuts a laterally projecting stub or tab 26 of the trigger finger 21. The trigger finger 21 rotates about pivot point 10.

The trigger finger pin 26 moves to the position 22 with the trigger finger 21 when it is released. When pin 26 is in the operative holding position it abuts the raised surface 24a of the plate 23 to block counter-clockwise rotation of the plate 23 which is biased in that direction under the influence of gravity. When the assembly is triggered by being passed over a magnetic material, the pin will move to position 22 and move away from blocking surface 24a of the raised section 24. The angle of face 24a relative to the centre of rotation of the plate 23 will determine when the plate 23 is released. If face 24a is set at angle 11, i.e., inclined in the direction of rotation to face inwardly of the plate, when the finger 21 is released its movement is blocked by the mass of the plate 23 until the castor receives a shock or jolt, e.g, from a groove or projection in the surface over which the castor is moving, to momentarily rotate the plate 23 clockwise and allow the finger 21 to rotate counterclockwise (biased by gravity) to position 22. At angle 11a, i.e., when the face 24a is substantially radially aligned with the rotational centre point of the plate, the mass of the plate acts in a line between face 24a, pin 26, and pivot 10. Thus, this angle results in a state of equilibrium, not biasing the finger 21 to rotate clockwise or counterclockwise. At angle 11b where the face 24a is inclined against the direction of rotation of the plate to face outwardly of it, the mass of plate 23 biases the trigger finger 21 to rotate in a counterclockwise direction. This would offer immediate release of the plate and brake foot but would also put the latching mechanism within main body 3 under continuous strain. The outer surface 24b on the raised section 24 prevents the trigger finger from being reset into its blocking position prior to the return of the braking member to is inoperative position.

Advantageously the plate is located between the castor fork 4 and the wheel 5. The plate 23 is permitted limited rotation between: in the inoperative position, the point where the brake foot 25 would come into contact with the top of the castor assembly; and in the operative position, the abutment of a stop 14 with the castor assembly.

The plate 23 is mounted for rotation about the wheel axis 3 on bearing surface 12 by means of an elongate slot 13. The bearing surface 12 is wider than the plate to permit the plate to rotate freely under the influence of gravity without interference from the wheel or castor fork. The plate 23 and thus the braking foot 25 are biased away from the wheel in the inoperative position, but the forces applied to the brake foot by gravity and the user pushing vehicle allow the bearing to move along the slot 13 when the assembly is triggered and thus move the brake foot move closer to the wheel. If the wheel over time becomes worn, then the movement of the plate permitted by the slot would enable the brake foot to follow the changing diameter of the wheel.

Once the assembly has been triggered and the plate has been released by pin 26 moving to position 22, then the plate 23 and thus the brake foot 25 will rotate in a counterclockwise direction. If the user of the trolley continues to push the trolley, the leading edge of the brake foot 25a will be trapped between the ground and the wheel and the braking action will start to occur. If the trolley is pushed further, the plate will continue to rotate, and the brake foot, which offers a caming action, is forced further between the ground and the wheel until the plate is prevented from further rotation by the stop 14 abutting with castor fork 4. There may be provided a further pin 15 projecting in the opposite direction to the stop 14 which would prevent the plate 23 and stop 14 from passing between the wheel and fork.

Of course, the skilled man will appreciate modifications to the described embodiment can be made without departing from the spirit of the attendant invention. For instance, the braking member could be effective even if is not mounted co-axially with the wheel. Also, the plate 23 and the flange 25 could be integrally formed.

What is claimed is:

1. A vehicle braking assembly for a wheel of a vehicle, the assembly comprising a main body, a braking member arranged to move relative to the main body between an inoperative and an operative braking position, blocking means for normally blocking movement of the braking member to its operative position, and trigger means which act in response to the main body being passed over magnetic material to release said blocking means to allow movement of the braking member to its operative position in which it is arranged to contact a supporting surface over which the assembly is passed to impede movement of the wheel relative to the surface by acting to cause the wheel to be raised relative to the surface, wherein said braking member comprises a first portion extending around a portion of a periphery of the wheel and having an outermost surface for frictional engagement with the supporting surface, and a second plate portion mounted on the first portion and disposed between the first portion and the main body, the first portion moving to a location between a periphery of the wheel and the surface when the braking member is moved to its operative position, and the blocking means comprising a raised surface on said second plate portion.

2. An assembly according to claim 1, wherein the first portion is tapered inwardly in a direction of rotation from the inoperative position to the operative position.

3. An assembly according to claim 1, wherein second portion of the braking member comprises a plate or disc-like member mounted co-axially with the wheel.

4. An assembly according to claim 1, wherein said second portion of said braking member has an elongate channel or slot to enable movement of the braking member relative to the wheel to move the braking member closer to the wheel in the operative position.

5. An assembly according to claim 1, wherein the trigger means contacts an end of the raised surface of the second plate portion of the braking member when the braking member is in its inoperative position to prevent movement of the braking member to its operative position.

6. A vehicle with a braking device as claimed in claim 1.

7. A braking system comprising the vehicle as claimed in claim 6, and a strip of magnetic material for mounting in conjunction with the supporting surface, the magnetic material being arranged to cause release of the blocking means upon the passage of the main body over the magnetic material.

* * * * *